Patented Mar. 26, 1946

2,397,144

UNITED STATES PATENT OFFICE 2,397,144

SULPHIDE IMPRESSION MATERIAL

Eugene J. Molnar, Toledo, Ohio

No Drawing. Application December 11, 1943,
Serial No. 513,993

10 Claims. (Cl. 18—47)

This invention relates to material for taking exact impressions of structures with a view to reproducing them in plaster or otherwise. It is an object of the invention to provide a cheap algin composition which sets quickly and without the use of heat to a tough strong condition so that when applied as an aqueous paste to a structure to be reproduced (such as artwork and figures, sculptors' work, mechanical shapes and the like, where elastic and plastic properties are of importance), and allowed to harden it can be stripped intact even when undercuts are present.

I have found that the sulphides of calcium and strontium when added to a solution of a water-soluble alginate have the property of causing the composition to set in a very short time to a tough strong gel. The strength of this gel is considerably greater than is the case when an alginate composition is set by means of such previously used agents as calcium sulphate, etc. An impression is produced in perfect detail which can be used as a mold to produce a plaster or other type of model.

The composition comprises a dry powder which is mixed with a definite amount of water immediately before use. The powder contains a water-soluble alginate (sodium, potassium or ammonium), a filler, and calcium or strontium sulphide or mixtures thereof as the setting agent for the alginate. The materials used as fillers (magnesium carbonate, calcium carbonate, asbestos, clays, zinc oxide, magnesium oxide, mica, etc.) make up the bulk of the powder and have some influence on the final physical properties of the gel, influence the setting time somewhat, the working properties of the paste and the fineness of the impression.

To decrease the speed of the setting reaction, where desired, it is advisable to add a small amount of a retarding agent which acts by way of forming an insoluble calcium or strontium salt such as an oxalate or a phosphate (e. g., sodium or potassium phosphate).

The following examples are illustrative of compositions according to my invention and are not to be considered as limiting. Parts are by weight.

Example 1

| | Parts |
|---|---|
| Magnesium carbonate | 12 |
| Zinc oxide | 3 |
| Sodium alginate | 3 |
| Strontium sulphide | 3 |
| Trisodium phosphate | 0.5 |

Example 2

| | Parts |
|---|---|
| Calcium carbonate | 20 |
| Magnesium oxide | 3 |
| Potassium alginate | 3 |
| Strontium sulphide | 3 |
| Tripotassium phosphate | 0.5 |

Example 3

| | Parts |
|---|---|
| Magnesium carbonate | 5 |
| Powdered mica | 5 |
| Powdered asbestos | 5 |
| Sodium alginate | 3 |
| Calcium sulphide | 3 |
| Trisodium phosphate | 0.5 |

The water-powder ratio for the above examples to make a satisfactory paste is 4 parts water to 1 part powder by weight. The mixing time is about 1 minute and the setting time about 3 minutes. The gelled composition in each case is strong, elastic and tough.

To improve the model it is preferable to place the impression in a tanning solution (potassium sulphate, copper sulphate, manganese sulphate, aluminum sulphate, etc.) which makes possible a faster separation of the impression from the plaster or artificial stone model and gives a better surface to the model.

I claim:

1. Impression material comprising a water-soluble alginate and a setting agent therefor selected from the group consisting of calcium and strontium sulphide.

2. Impression material comprising a water-soluble alginate, a powdered filler, and a setting agent selected from the group consisting of calcium and strontium sulphide.

3. Impression material comprising sodium alginate, a powdered filler and calcium sulphide.

4. Impression material comprising sodium alginate, a powdered filler and strontium sulphide.

5. Impression material comprising a water-soluble alginate and a setting agent therefor selected from the group consisting of calcium and strontium sulphides, in the ratio of about 3 parts of alginate to 3 parts of sulphide by weight.

6. Impression material comprising potassium alginate, a powdered filler, and a setting agent therefor selected from the group consisting of calcium and strontium sulphides.

7. Impression material comprising a water-soluble alginate, a setting agent therefor selected from the group consisting of calcium and strontium sulphides, and a retarding agent.

8. Impression material comprising a water-soluble alginate, a setting agent therefor selected from the group consisting of calcium and strontium sulphides, a powdered filler, and a retarding agent.

9. Impression material comprising sodium alginate, a setting agent therefor selected from the group consisting of calcium and strontium sulphides, and a soluble phosphate as a retarding agent.

10. Impression material comprising potassium alginate, a setting agent therefor selected from the group consisting of calcium and strontium sulphides, and a soluble phosphate as a retarding agent.

EUGENE J. MOLNAR.